March 12, 1946. K. A. BROWNE 2,396,361
HYDRAULICALLY OPERATED ROTATING CLUTCH
Filed March 22, 1943 2 Sheets-Sheet 2
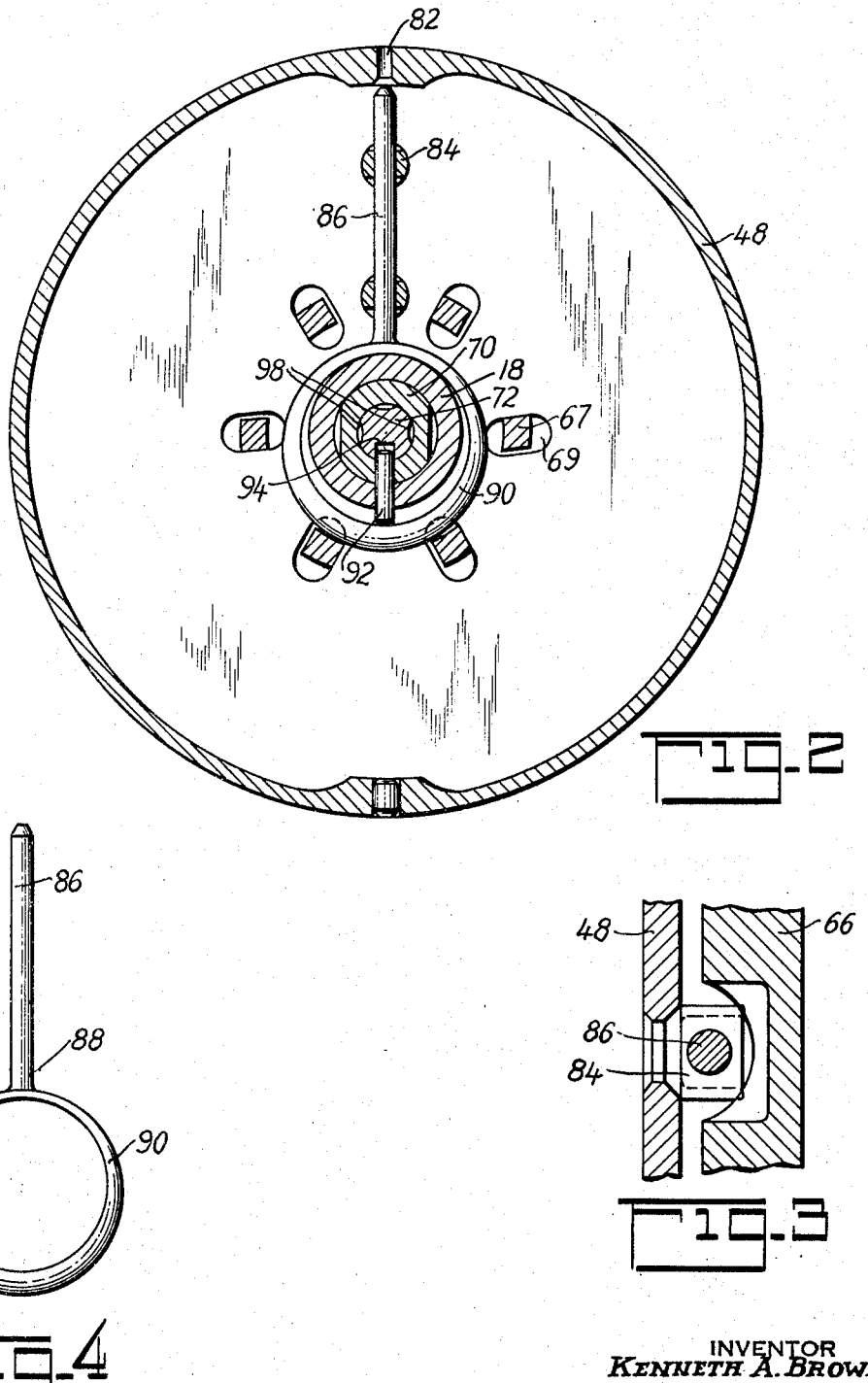
INVENTOR
*KENNETH A. BROWNE.*
BY
ATTORNEY Patented Mar. 12, 1946

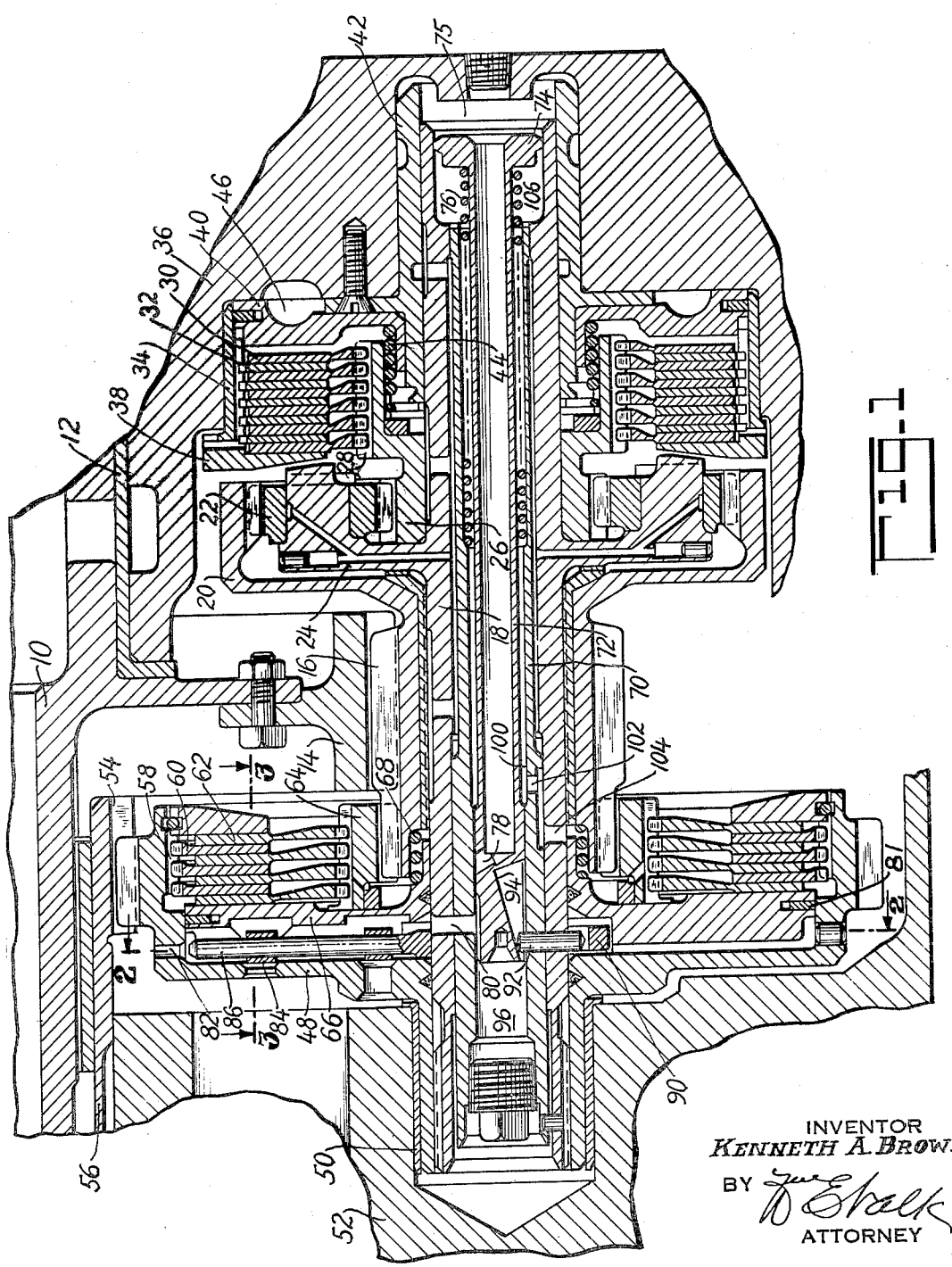

2,396,361

UNITED STATES PATENT OFFICE 2,396,361

HYDRAULICALLY OPERATED ROTATING CLUTCH

Kenneth A. Browne, Ridgewood, N. J., assignor to Wright Aeronautical Corporation, a corporation of New York Application March 22, 1943, Serial No. 480,115

6 Claims. (Cl. 121—38)

This invention relates to rotating hydraulic cells and is particularly directed to the provision of means for preventing the accumulation of sludge and other solid matter in such cells.

As disclosed in Patent No. 2,101,239 to Roland Chilton, it is common practice to control a multispeed supercharger drive by a rotating piston-cylinder motor assembly. The assembly rotates on its own axis at relatively high speed and upon application of fluid pressure to the cylinder, the associated piston is actuated to enforce engagement of a friction clutch or brake. When the fluid pressure is cut off the centrifugal force acting on the oil tends to prevent retraction of the piston and disengagement of the friction clutch until the oil is drained from the clutch cylinder. In order to permit disengagement of the friction clutch, it is common practice to provide an oil leakage path out of the clutch cylinder and this necessarily results in a continuous flow of oil through the cylinder behind the piston while the clutch is engaged. The oil leakage path is made sufficiently large to provide quick drainage of the clutch cylinder with resulting quick disengagement of the clutch when the oil pressure is cut off. When the clutch is engaged the oil flow through the cylinder may be as much as 50 gallons per hour. This large quantity of oil circulated through the clutch cylinder results in a considerable accumulation of sludge in the cylinder behind the piston. Such accumulation of sludge behind the piston may prevent retraction of the piston when the oil pressure is cut off. It is an object of this invention to provide means to vent the clutch cylinder when the oil pressure is cut off and to automatically prevent circulation of oil through the rotating clutch cylinder while the clutch is engaged. That is, with this invention, the only oil circulated through the clutch is the small amount maintained in the cylinder while the clutch is engaged, which oil is vented when the oil pressure is cut off to disengage the clutch. Accordingly, the quantity of oil circulated through the clutch cylinder is relatively small so that the sludge accumulation is negligible.

Specifically, the invention comprises a vent port at the periphery of the rotating cylinder and a valve element rotatable with the cylinder and mounted for radial movement in response to centrifugal force acting thereon to close the vent. When the oil pressure to the cylinder is shut off, means are provided to open and hold said valve element in its open position to thereby permit the oil to drain out of the clutch cylinder.

Other objects of this invention will become apparent in reading the annexed detailed description in connection with the drawings, in which:

Fig. 1 is an axial section through a two-speed transmission embodying the invention;

Figs. 2 and 3 are sections on the lines 2—2 and 3—3 of Fig. 1; and

Fig. 4 is a detailed view of the valve element.

Referring to Fig. 1 of the drawings, a crankshaft 10 is supported in a bearing 12 and is provided with a gear drive 14 meshed with a pinion 16 journaled about a layshaft 18 and formed integral with an internal gear 20. A plurality of planet pinions 22 are journaled on a spider 24 formed on the layshaft 18, said pinions engaging the internal gear 20 and a sun gear 26 mounted for rotation about the layshaft 18. The sun gear 26 is provided with splines 28 engaging a plurality of clutch plates 30, and intermediate thereto are a plurality of clutch plates 32 splined to a drum 34 secured to the housing 36. The left end of the drum 34 is provided with a fixed abutment plate 38 while the right end of this drum provides a cylinder for an annular piston 40 slidably mounted on the bushing 42. This bushing also provides a bearing for the righthand end of the layshaft 18. A spring 44 biases the piston to the right away from the clutch plates 30 and 32 while fluid pressure may be admitted behind the piston to the cylinder space 46 to engage the clutch plates 30 and 32 to thereby lock the sun gear 26 against rotation. When the sun gear 26 is thus locked, a drive is provided from the crankshaft 10 through gears 14, 16 and 20 and planet pinions 22 to the layshaft 18.

The left end of the layshaft 18 is splined to a supercharger impeller drive gear 48 journalled in a bearing 50 supported in a housing structure 52. The drive gear 48 is provided with a cylindrical rim portion and is meshed with a pinion 54 formed on a supercharger impeller drive shaft 56 journaled about the crankshaft 10. The rim portion of the drive gear 48 is provided with internal splines 58 with which are engaged clutch plates 60. Engageable with these clutch plates 60 are intermediate clutch plates 62 splined to a drum 64 which in turn is drivably connected to the crankshaft gear 14 by an extension of the pinion 16. A piston 66 is mounted within the cylindrical bore of the gear 48 and is biased out of engagement with the clutch plates 60 and 62 by a spring 68. As best seen in Fig. 2, this piston is provided with axially extending projections 67 engaging recesses 69 in the gear 48 to provide for joint rotation of the piston and gear.

Upon admission of fluid pressure to the space behind the piston 66, the piston is actuated to engage the clutch plates 60 and 62 to provide a direct drive from the crankshaft to the rim of the impeller drive gear 48.

From the above description it may be seen that when fluid pressure is admitted behind the piston 40 to engage clutch plates 30 and 32, a step-up drive is provided from the crankshaft to the impeller drive gear 48 through the planet pinions 22. When fluid pressure is admitted behind the piston 66 to engage clutch plates 60 and 62, a direct drive is provided from the crankshaft to the impeller drive gear 48. Selective valve control means, not shown, are provided to control the application of fluid pressure to either piston 40 or 66. The above described structure is conventional and for a more detailed description, reference may be had to the aforementioned patent of Roland Chilton.

The impeller drive gear 48 and piston 66 comprise a constantly rotating piston-cylinder assembly operable to engage or disengage the clutch plates 60 and 62. When the oil pressure is cut off from the piston 66, the centrifugal force acting on the oil behind this piston would prevent retraction of the piston unless a vent were provided at the periphery of the cylinder behind the piston. Accordingly, it has been conventional practice in the past to provide a continuous leakage path for the oil out and around the periphery of the piston 66 and clutch plates 60 and 62. In this way when the oil pressure is cut off, the centrifugal force acting on the oil is operative to drain the oil from the cylinder behind the piston through this leakage path. With this prior art construction, when the clutch plates 60 and 62 are engaged, there is a continual flow of oil through the piston-cylinder assembly, and as a result a considerable amount of sludge accumulates behind the piston. The primary purpose of this invention is to eliminate the necessity for this continual flow of oil through the piston-cylinder assembly. At this point it should be noted that although the invention is herein disclosed in connection with a two-speed supercharger drive, the invention is of general application and could be used with any rotating piston-cylinder motor.

The layshaft 18 is hollow and a sleeve 70 is secured therein and provides a cylinder for a hollow plunger element 72. The righthand end of the plunger 72 is provided with an annular piston head 74, and a spring 76 acting between this head and the sleeve 70, biases the plunger to the right. Oil pressure may be admitted to the space 75 in front of the piston head 74 and into the hollow plunger 72 by control valve means not shown. This pressure acts against the face of the piston 74 to move the plunger element 72 to the left against the bias of spring 76. This movement of the plunger element alines the radial port 78, at the left end of the plunger, with a radial port 80 extending through the sleeve 70 and layshaft 18 and through which oil may be admitted behind the piston 66 to engage the clutch plates 60 and 62. A rubber piston ring 81 provides a seal preventing oil leakage around the periphery of the piston when the clutch is engaged.

A vent port 82 is provided at the outer periphery of the rim of gear 48 and a plurality of radially spaced guide posts 84 are mounted on the inner side of this gear to provide a radial guide for the valve stem portion 86 of a valve element 88. This valve element comprises the valve stem portion 86 and an annular portion 90 having an internal diameter somewhat greater than the outer diameter of the layshaft 18 about which this valve element is loosely mounted. The clearance between the layshaft 18 and the annular portion 90 of the valve element is such that the valve stem portion 88 may move radially outward to close the vent port 82. A pin 92 is radially mounted through the sleeve 70 and layshaft 18 in alinement with the valve element for sliding movement relative thereto. The inner end of the pin 92 is adapted to cooperate with a camming groove 94 formed in the lefthand head of the plunger 72. The relation of the parts is such that when the plunger 72 is in its righthand position, as seen in Fig. 1, the cam 94 depresses the pin 92 to prevent the valve stem from closing the port 82. However, when the plunger is moved to the left, the cam groove 94 permits the pin 92 and valve element 88 to move upwardly, as viewed in Fig. 1, under the action of centrifugal force to close the port 82.

In order to vent the space 96 behind the lefthand head of the plunger 72, a pair of flats 98, best seen in Fig. 2, are formed on the plunger to provide communication between the space 96 and the annular space 100 between the sleeve 70 and the intermediate reduced diameter portion of the plunger 72. This latter space is vented through passages 102 and 104, and the space 106 in front of the plunger head 74 is also vented through these passages, thereby insuring free movement of the plunger in response to the application of fluid pressure and to the spring 76.

The annular portion 90 of the valve element 88 is unsymmetrical, as best seen in Fig. 4, the heavier side of the annular portion being opposite the stem portion 86. In this way the center of gravity of the valve element is only slightly off-center on the valve stem side and the centrifugal force on this valve element is thereby kept within reasonable limits.

With the above construction, when oil pressure is supplied to the space 75, the plunger 72 is moved to the left to aline ports 78 and 80 and admit oil behind the piston 66 to thereby engage the clutch plates 60 and 62. Simultaneously, this leftward movement of the plunger 72 alines the cam pin 92 with the deep end of the cam groove 94 thereby permitting the valve stem 88 to move radially outward under the action of centrifugal force to close the port 82. When the oil pressure to the piston 66 is shut off, the spring 76 operates to move the plunger 72 to the right, whereupon the camming groove 94 moves the pin 92 radially outward against the annular portion 90 of the valve element to open the vent port 82. Thereupon, the oil immediately drains out from behind the piston 66 through the vent 82, whereupon spring 68 disengages the clutch plates 60 and 62.

The provision of the automatically operable valve element 88 thereby makes it unnecessary to continuously circulate oil through the clutch cylinder while the clutch is engaged. This valve element automatically closes the vent from the cylinder when fluid pressure is applied thereto so that there is then no circulation of the oil through the cylinder. When the fluid pressure is cut off, the valve element opens the vent port 82 to permit the cylinder to drain. That is, when the fluid pressure is cut off, the vent is opened to relieve the centrifugal oil pressure which would otherwise maintain engagement of the clutch plates 60 and 62.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a hydraulic mechanism, a rotatable cylinder having a vent passage extending from a point adjacent its periphery, a piston slidably mounted within said cylinder, means to supply fluid pressure to said cylinder for actuating said piston, a valve member rotatable with said cylinder and movable to open and close said vent passage, said valve member being urged toward vent-closing position in response to the centrifugal force acting on said valve member, means operative to hold said valve member in vent-open position against the centrifugal force acting thereon when said fluid pressure is cut off from said cylinder, said last named means being automatically effective, upon application of fluid pressure to said cylinder, to permit movement of said valve member to vent-closing position in response to the centrifugal force acting on said valve member.

2. In a hydraulic mechanism, a rotatable cylinder having a vent passage extending from a point adjacent its periphery, a piston slidably mounted within said cylinder, means to supply fluid pressure to said cylinder for actuating said piston, a valve member movable to open and close said vent passage, said valve member being rotatable with said cylinder and being urged toward vent-closing position in response to the centrifugal force acting thereon, means movable in response to the application and relief of fluid pressure from said cylinder, said movable means being effective when said fluid pressure is cut off from said cylinder to hold said valve member in vent-open position against the centrifugal force acting on said valve member and being effective upon application of fluid pressure to said cylinder to permit movement of said valve member to vent-closing position in response to the centrifugal force acting on said valve member.

3. In a hydraulic mechanism, a rotatable cylinder having a vent passage extending from a point adjacent its periphery, a piston slidably mounted within said cylinder, means to supply fluid pressure to said cylinder for actuating said piston, a valve member rotatable with said cylinder and movable to open and close said vent passage, said valve member being urged toward vent-closing position in response to the centrifugal force acting on said valve member, means engageable with said valve member and operative to hold said valve member in vent-open position when said fluid pressure is cut off from said cylinder, said last named means automatically moving, upon application of fluid pressure to said cylinder, to permit movement of said valve member to vent-closing position in response to the centrifugal force acting on said valve member.

4. In a hydraulic mechanism having means to feed fluid pressure thereto, a rotatable cylinder having a vent, a piston movable within said cylinder by said fluid pressure, a valve element rotatable with said piston-cylinder assembly and urged to vent closing position by the centrifugal force acting thereon, and cam means movable in response to the application or relief of said fluid pressure to respectively permit or prevent movement of said valve element to vent-closing position.

5. In a hydraulic mechanism, an annular cylinder mounted about and rotatable with a hollow drive shaft and having a vent at its outer periphery, an annular piston reciprocable within said cylinder, said piston being reciprocable in said cylinder by fluid pressure fed thereto through said hollow shaft, a plunger element slidably mounted within said hollow shaft and reciprocable by said fluid pressure, a valve element rotatable with said shaft and cylinder, said valve element being urged to vent closing position by the centrifugal force acting thereon, and means controlled by the reciprocation of said plunger and operative to prevent movement of said valve element to vent-closing position when said fluid pressure is cut off.

6. In a hydraulic mechanism, an annular cylinder mounted about and rotatable with a hollow drive shaft and having a vent at its outer periphery, an annular piston reciprocable within said cylinder, said piston being reciprocable in said cylinder by fluid pressure fed thereto through said hollow shaft, a plunger element slidably mounted within said hollow shaft and reciprocable by said fluid pressure, a valve element rotatable with said shaft and cylinder, said valve element being urged to vent closing position by the centrifugal force acting thereon, and means controlled by the reciprocation of said plunger and operative to prevent movement of said valve element to vent-closing position when said fluid pressure is cut off and operative to permit movement of said valve element to vent-closing position upon application of said fluid pressure.

KENNETH A. BROWNE.